Patented Apr. 18, 1933

1,903,962

UNITED STATES PATENT OFFICE

HENRY DREYFUS, OF LONDON, ENGLAND

MANUFACTURE OF CELLULOSE OR CELLULOSIC PRODUCTS

No Drawing. Application filed September 5, 1931, Serial No. 561,443, and in Great Britain November 8, 1930.

This invention relates to the manufacture of cellulose or cellulosic materials from wood, straw, grass and the like.

In the production of cellulose or cellulosic materials from raw materials, such for example as wood, straw, grass or the like, the said raw materials are usually treated with chemical reagents at high temperature much above the boiling point of the liquors, and in order to maintain the liquor in liquid form the treatment is performed in closed digesters whereby high pressures are developed. Thus for example in sulphite processes, temperatures ranging from about 135°–155° C. are employed and the pressures developed are from about 4–6 atmospheres, whilst in the soda process temperatures up to 180° C. and pressures from 6½ to 9 atmospheres are developed.

I have found that whilst the effect of pressure is very beneficial (inter alia in ensuring thorough impregnation and homogeneous attack of the materials by the liquors) the use of temperatures necessary to attain such pressures causes excessive attack upon the cellulose especially in cases where long or intensive treatment to remove all non-cellulosic constituents is resorted to. Moreover I have found that pressures higher than those developed in the known process are very beneficial.

According to the present invention I produce the necessary high pressures by means or with the aid of inert gases or vapours which are introduced into the reaction vessels or digesters, whether directly or by development from materials introduced into said vessels or digesters in addition to the normal ingredients.

In performing the invention I preferably employ lower temperatures than are normally employed in the particular pulping process. As in the prior pulping process hereinbefore referred to such temperatures will, of course, vary with the particular process and the particular conditions employed, e. g. the concentration of the reagents and the length of treatment. In general, however, temperatures of between about 100° and 120° C. are very suitable for the purposes of the invention.

The pressures to be employed for the purposes of the invention may be such as are commonly employed in the particular pulping process, e. g. about 2 to 10 atmospheres. I preferably, however, employ higher pressures such for instance as 20 to 100 atmospheres, especially when operating with low temperatures such as about 100° to 120° C.

The inert gases or vapours may be introduced under the requisite or appropriate pressure into the digester at any time during the process; thus for example nitrogen or other inert gas or vapor may be pumped into the digester, which is then closed and heated to the desired reaction temperature with consequent increase in pressure, or for example the inert gas or vapour may be pumped into the digester during or after the heating thereof to the desired reaction temperature.

According to a further form of execution I may, as well as or instead of introducing gases or vapours under pressure into the digester, introduce into the reaction materials or otherwise into the digester inert liquids which vaporize in the reaction vessel or digester so as to maintain the contents of the digester under the desired pressure. As examples of such inert liquids may be mentioned ether, low boiling hydrocarbons such for instance as petroleum ether, methyl alcohol, ethyl alcohol and like volatile organic liquids.

The process of the invention may be applied to any chemical pulping processes, such for example as the soda, sulphite or sulphate processes, and is of particular value when applied to the soda process where the use of high temperatures such as 170°–180° C. has heretofore been regarded as necessary.

Advantageously the chemicals employed for pulping may be employed in quantities in excess of those theoretically necessary. Thus for instance when alkaline cooks are employed the caustic soda and/or sodium sulphide or other reagents may advantageously be employed in excessive quantities such for example as about 20 to 50% of those theoretically necessary. In alkaline cooks the alkali, especially when employed in excess, is preferably used in dilute form, e. g. in the form of an aqueous solution of about 2–4% strength, particularly in concentration of about 2% strength.

By means of the invention cellulose or cellulosic materials may be obtained from wood, straw, grass and the like by treatment in which all the attendant advantages of high pressures are secured without the necessity for the use of high temperatures with their attendant disadvantages, and particularly the attack upon the cellulose and resulting lowering of the yield.

The following examples serve to illustrate convenient forms of execution of the invention, it being understood that they are given solely by way of illustration and are in no way limitative.

Example 1

100 parts of wood in the form of chips are charged into a digester and impregnated with about 900 to 1200 parts of caustic soda of about 4% strength. The impregnation of the wood is preferably facilitated by applying a vacuum to the wood in the digester and thereafter allowing the caustic soda to enter. After the impregnation the digester is closed, nitrogen or other inert gas being pumped in until a pressure of 20 to 25 atmospheres is attained. The materials are allowed to stand under this pressure for about 1 to 2 hours, whereafter the temperature is raised to between 100° and 120° C. The digester is maintained at such temperature until the cook is complete, i. e. from about 3 hours in cases where hard woods are cooked, to about 5 to 7 hours in cases where pine woods or the like are cooked.

Example 2

The process is carried out as in Example 1, but there is added to the digester subsequent to the impregnation of the wood and prior to closing the digester and introduction of the inert gas, a volatile liquid, such as ether or petroleum ether, in amount between 10 and 35% of the weight of the wood.

Example 3

Wood in the form of chips is charged into a digester and impregnated with about 8 to 10 times its weight of a sulphite cooking liquor containing between 3 and 4% total $SO_2$ of which about 1.8 to 2.8% is free and about 1.2% is combined. The impregnation is preferably facilitated by applying a vacuum to the wood in the digester and thereafter allowing the sulphite liquor to enter. After the impregnation the digester is closed and nitrogen or other inert gas is pumped in until a pressure of 15 to 25 atmospheres is attained. The materials are allowed to stand under this pressure for about 1 to 2 hours, whereafter the temperature is raised to between 110 and 120° C., the digester being maintained at such temperature for 16 to 24 hours to complete the cook.

Example 4

The process is carried out as in Example 3, but there is added to the digester subsequent to the impregnation of the wood and prior to closing the digester and introduction of the inert gas, a volatile liquid such as ether or petroleum ether in amount between 10 and 35% of the weight of the wood.

What I claim and desire to secure by Letters Patent is:—

1. Process for the manufacture of cellulose or cellulosic materials from wood, straw, grass or other raw materials by processes in which the materials are subjected to the action of chemical reagents at elevated temperatures and under elevated pressure, characterized in that such pressure is produced at least partly by means of inert gases or vapours which are introduced into the reaction vessel or digester whether directly or by development from materials introduced into said vessel or digester in addition to the normal reaction ingredients.

2. Process for the manufacture of cellulose or cellulosic materials from wood, straw, grass or other raw materials, comprising subjecting the raw materials to the action of hot alkaline substances under elevated pressure, which pressure is at least partly produced by means of inert gases or vapors which are introduced into the reaction vessel directly or by development from materials introduced into the reaction vessel in addition to the normal reaction ingredients.

3. Process for the manufacture of cellulose or cellulosic materials from wood, straw, grass or other raw materials, comprising subjecting the raw materials to the action of hot acid liquors under elevated pressure, which pressure is at least partly produced by means of inert gases or vapors which are introduced into the reaction vessel directly or by development from materials introduced into the reaction vessel in addition to the normal reaction ingredients.

4. Process according to claim 1 and wherein the process is performed at a temperature between 100° and 120° C.

5. Process according to claim 1 and wherein the process is performed under a pressure of between 20 and 100 atmospheres.

6. Process according to claim 1 and wherein the process is performed at a temperature between 100° and 120° C. and under a pressure of between 20 and 100 atmospheres.

7. Process for the manufacture of cellulose or cellulosic materials from wood, straw, grass or other raw materials by processes, comprising subjecting the raw materials in a digester to the action of chemical reagents at elevated temperatures and under elevated pressure, which pressure is produced by pumping an inert gas into the digester.

8. Process for the manufacture of cellulose or cellulosic materials from wood, straw, grass or other raw materials, comprising subjecting the raw materials to the action of chemical reagents at elevated temperatures and under elevated pressures, which pressure is at least partially produced by adding to the materials to be subjected to the process a volatile liquid.

9. Process according to claim 8 and wherein a volatile liquid selected from the group of aliphatic volatile liquids comprising ether, low boiling hydrocarbons, methyl alcohol and ethyl alcohol, is employed.

10. Process according to claim 7 and wherein alkaline chemical reagents are employed in quantities of between 20 and 50% in excess of the quantities theoretically necessary.

11. Process according to claim 8 and wherein alkaline chemical reagents are employed in quantities of between 20 and 50% in excess of the quantities theoretically necessary.

12. Process according to claim 7 and wherein alkaline chemical agents of from 2 to 4% concentration are employed in quantities of between 20 and 50% in excess of the quantities theoretically necessary.

13. Process according to claim 8 and wherein alkaline chemical agents of from 2 to 4% concentration are employed in quantities of between 20 and 50% in excess of the quantities theoretically necessary.

In testimony whereof I have hereunto subscribed my name.

HENRY DREYFUS.